United States Patent [19]

Jacobs

[11] Patent Number: 4,761,313

[45] Date of Patent: Aug. 2, 1988

[54] COMPOSITION AND METHOD FOR THE PRODUCTION OF CHEMICAL RESISTANT NON-POROUS PLASTIC FLOORING

[75] Inventor: Eugene F. Jacobs, Tulsa, Okla.

[73] Assignee: Concrete Protection Systems, Inc., Tulsa, Okla.

[21] Appl. No.: 944,847

[22] Filed: Dec. 22, 1986

[51] Int. Cl.$^4$ .............................................. B05D 1/36
[52] U.S. Cl. ................... 427/407.1; 427/403; 427/419.2; 427/419.5
[58] Field of Search ............ 427/386, 140, 136, 407.1, 427/403, 419.2, 419.5

[56] References Cited

U.S. PATENT DOCUMENTS

| | | |
|---|---|---|
| 3,008,387 | 11/1961 | Wittenwyler et al. ............... 427/136 |
| 3,345,555 | 8/1967 | Nagin et al. ......................... 427/136 |
| 3,423,224 | 1/1969 | Schmidt et al. ..................... 427/136 |
| 4,180,166 | 12/1979 | Batdorf ............................... 427/386 |
| 4,265,957 | 5/1981 | Severance et al. ............... 427/407.1 |

Primary Examiner—Thurman K. Page
Assistant Examiner—L. R. Horne
Attorney, Agent, or Firm—William S. Dorman

[57] ABSTRACT

A method of applying a filled thermosetting resin flooring material to an essentially horizontal substrate to produce a non-porous protective coating which involves compounding a mixture of a thermosetting resin with an aggregate, the mixture using a low level of 50 to 75% aggregate by weight; the aggregate being a graded aggregate that will produce maximum packing and having a specific gravity of over 2.0; the thermosetting resin having a room temperature cure and a viscosity less than 1500 cps; spreading or troweling the mixture on the substrate producing a resin rich layer upon setting; and broadcasting onto the resin rich layer an aggregate having a specific gravity of over 2.0, thereby producing a finished flooring material containing 76 to 82% filler by weight.

2 Claims, No Drawings

COMPOSITION AND METHOD FOR THE PRODUCTION OF CHEMICAL RESISTANT NON-POROUS PLASTIC FLOORING

BACKGROUND OF THE INVENTION

1. Field of the Invention

This invention relates to the production of plastic flooring applied over concrete and other rigid materials of construction utilizing thermosetting resins and aggregate fillers to form an impervious and non-porous coating that provides permanent corrosion protection for the substrate. While flooring has been produced using these general classifications of materials, the results have not provided permanent protection and only short term protection when exposure has been on a continuous basis.

2. Prior Art

Concrete is subject to chemical attack by most classes of inorganic and organic chemicals: acids, alkalis, salts, oxidizing chemicals, sugars, and soap are some of these chemicals. Concrete is also a porous material permitting moisture permeation which under freeze-thaw conditions will cause physical deterioration of the concrete.

Several categories of thermosetting resins have been developed that are chemically resistant to the greatest majority of these chemicals and that can be coated on the concrete to afford chemical protection. The commonly used resins for this purpose are known as epoxies, polyesters, vinyl esters, and urethanes. To provide prolonged protection using these thermosetting resins it has been found necessary to apply these materials to a minimum thickness of ⅛ inch thick to prevent the chemical permeation through the resin, and ¼ inch thick to prevent damage to the underlying concrete from mechanical abuse which ultimately will break down the flooring material.

Inert fillers are added in large quantity to the liquid thermosetting resins for several purposes: (1) to decrease shrinkage which may cause cracking of the flooring material during curing and which will set up stresses that may cause cracking after curing due to thermal expansion and mechanical usage, (2) to increase the compressive strength of the flooring, (3) to increase wear and abrasion resistance, (4) to aid in troweling or spreading the thick section coatings, and (5) to lower the cost of the flooring material.

It has been found that to accomplish the above requires filler loading of from 76% to 85%; the bulk of the fillers normally used are silica sands. Flooring mixes using these loading levels produce very stiff materials. Air is inadvertently mixed into and dispersed throughout the materials and the dispersed air will not release before or during application due to the stiffness of the mix.

The porosity created by the dispersed air permits chemicals to physically penetrate the finished cured flooring; the chemicals attack the concrete at the interface of the flooring causing the flooring to progressively lift in layers.

To prolong the life of plastic flooring the industry has adopted the procedure of applying a sealer coat of the chemically resistant resin to the cured flooring. The protection afforded by the sealer coat however is not permanent. Since the sealer is only a thin membrane, the chemicals eventually permeate the sealer and then reach the concrete; sealer coats are also subject to wear and become ineffective in time with foot traffic or mechanical traffic that is encountered in industry. The present industry standard limits long term corrosion resistance of plastic flooring to only spill and splash exposure conditions which must be followed by wash down and periodic re-sealing.

It is the purpose of this present invention to overcome the drawbacks of the aforementioned flooring materials, producing a plastic flooring that is non-porous, and providing permanent corrosion resistance under continuous chemical exposure without the sacrifice of the benefits listed above for high filler loading.

Thus, it is a purpose of the present invention to eliminate air from the topping or covering. If air is not eliminated, the covering layer is porous and may permit chemicals to penetrate through the covering to the concrete below.

It is a further object of this invention to provide a method of application of this material that will insure totally reliable performance when applied by applicators who are not skilled in the art of plastic flooring application.

A patentability search was conducted on the present invention and the following U.S. patents were uncovered in the search:

| U.S. Pat. No. | Patentee | Issue Date |
| --- | --- | --- |
| 3,334,555 | Nagin et al. | August 8, 1967 |
| 3,360,391 | Richtzenhain et al. | December 26, 1967 |
| 3,476,577 | Davie | November 4, 1969 |
| 3,552,988 | Boiardi | January 5, 1971 |
| 3,617,329 | Goff | November 2, 1971 |
| 3,682,676 | Karrh et al. | August 8, 1972 |
| 4,296,167 | Ceintry | October 20, 1981 |

The above patent to Nagin et al. relates to using a flexible layer to improve the bonding characteristics of the flooring material. This patent provides a method of preventing cracking by the use of a flexible resin as the initial layer.

Richtzenhain et al. relates to a flexibilized resin system. This patent provides a flexibilized resin system and a procedure for forcing aggregate into the resin after the resin is partially cured.

Davie discloses an antiflowing composition.

Boiardi provides a method of producing terrazzo floor covering by first applying primer and then using less than one-half of the aggregate in the initial pour. Large chips are used having a thickness of approximately equal to the desired thickness of the finished floor. The aggregate in the first pour protrudes up through the surface and is used to control the thickness of the material applied. The final distributed aggregate must be troweled in to make the surface smooth. The final product is ground down.

Goff relates to equipment or machinery for applying coating or flooring.

Karrh et al. discloses a method of coating pipe by rotating the pipe while applying the dry aggregate. The aggregate is blown in in a single step at a minimum velocity of five feet per second.

Ceintry discloses a resin composition using a nonwoven fiber.

SUMMARY OF THE INVENTION

This invention relates to the production of plastic flooring applied over concrete and other rigid materials of construction utilizing thermosetting resins and aggregate fillers to form an impervious and non-porous coating that provides permanent corrosion protection for the substrate. More particularly, this invention involves compounding a mixture of a thermosetting resin with an aggregate wherein the initial mixture contains from 50% to 60% of the total aggregate to be used in the final coat of flooring material. The initial mix is spread or troweled onto the substrate to produce a resin-rich layer upon settling. Thereafter, the remainder of the aggregate to be used is broadcast onto the resin-rich layer and allowed to settle into the initial layer.

The thermosetting resin can be epoxy, polyester, vinyl ester, urethane, or furan. By the term "furan", the applicant refers to furfuryl alcohol based resin. The aggregate, which should have a specific gravity of over 2.0, can be silica sand, flint, aluminum oxide, or treated silicas. The aggregate, which has a density of approximately 2.5 times that of the resin, will settle in the initial pour, and the air that was mixed in during the mixing or spreading process will be displaced by the packed aggregate and will rise to the surface. This leaves a non-porous coating with a resin-rich surface layer. The remainder of the aggregate is broadcast into the resin-rich layer before the resin viscosity begins to increase due to curing. The resin-rich layer thus becomes saturated with aggregate. The finished flooring contains 76% to 82% aggregate, will be non-porous, and will not require a sealer coat. The finished coating will give unlimited service life under continuous chemical exposure conditions.

DETAILED DESCRIPTION OF THE PREFERRED EMBODIMENT

This invention is a method of making a plastic floor covering for the corrosion protection of concrete primarily but also suitable for the protection of other rigid floor substrate. Features of the method are: (1) a mix is made using less than all of the aggregate which is ultimately required in the coating; that is, a low level of silica sand aggregate, 50% to 60% of the total required aggregate, is mixed with a low viscosity thermosetting resin and a curing agent or catalyst that will cure the resin at room temperature. The aggregate particle size is graded to allow for maximum packing. The maximum aggregate particle diameter is only a fraction if the thickness of the coating thickness. The finished coating thickness will range from a minimum of ⅛ inch to over ¼ inch thick. The fluid mix is troweled or spread on the substrate to the desired thickness.

After the material has been spread, the aggregate, which has a density of approximately 2.5 times that of the resin, will settle. At this time, air that was mixed in during the mixing or spreading process will be displaced by the packed aggregate, and will rise to the surface. This leaves a non-porous coating with a resin-rich surface layer.

Before the resin viscosity begins to increase due to the curing process, a fine particle silica (essentially all of the remainder of the required aggregate) is broadcast on the surface of the coating until the resin-rich layer is saturated. If a textured non-slip surface is desirable, excess aggregate is broadcast.

The finished flooring contains 76% to 82% aggregate, will be totally non-porous, and will not require a sealer coat. The finished coating will give unlimited service life under continuous chemical exposure conditions.

SELECTION OF MATERIALS

Resin—A variety of thermosetting resin types will work satisfactorily using the features of this invention as long as they meet the following requirements:
Viscosity: 300 to 1500 cps
Cure: ambient temperature
Chemical resistance—unlimited ASTM c 581

Epoxy, polyester and vinyl ester resins are readily available thermosetting types that meet the above requirements and work well using the features of this invention.

Filler for mix—A variety of fillers will work satisfactorily using the features of this invention as long as they meet the following requirements:
Specific Gravity (minimum): 2.00
Particle Diameter (maximum): ⅛ inch

| Typical Grading: | |
|---|---|
| US Sieve No. | % Retained |
| 6 | 0 |
| 8 | 0–10 |
| 16 | 0–20 |
| 30 | 25–35 |
| 50 | 35–45 |
| 100 | 5–15 |

Sized silica sands meet the requirements of this invention and are readily available.

Filler for broadcasting—A variety of fillers will work satisfactorily using the features of this invention as long as they meet the following requirements:
Specific Gravity (minimum): 2.00

Particle size and size distribution will vary depending on the surface texture and appearance required for the application.

Sized silica sands meet the requirements of this invention and are readily available. Other preferred fillers are aluminium oxide where extreme hardness is important, and ceramic color coated quartz such as that manufactured by the 3M Company under the trade name Color Quartz where decorative effects are important.

Following is a specific example of a coating using the features of this invention:

EXAMPLE

The following is an example of an epoxy flooring material compounded and applied using the features of this invention:

| Mix: | Parts by Weight |
|---|---|
| Diglycidalether of Bisphenol A - Epoxy Resin | 1000 |
| Butyl Glycidal Ether - Reactive diluent | 150 |
| Diethylene Triamine - Curing agent | 100 |
| Grey Color Paste | 70 |
| Graded Silica Sand | 3060 |

The above mix was troweled onto a concrete slab to a thickness of 3/16 inch.

After a period of 5 minutes the aggregate had settled and left a resin-rich layer at the surface of the coating.

Broadcast onto this coating was 2220 parts by weight of a silica and having a particle size of 100% passing through a U S Sieve No. 100 and 2% passing through a U S Sieve No. 200.

The final composition of this coating contained 80% by weight of silica sand.

Photomicrographs of the sectioned slab showed no voids in the coating material and no separation of the coating from the concrete.

Chemical testing was performed by immersing the coated concrete slab in each the following chemicals separately:

| | |
|---|---|
| 10% | Hydrochloric Acid |
| 10% | Sulfuric Acid |
| 10% | Sodium Hydroxide |
| 10% | Salt Water |

After one year exposure there was no visible signs of coating separation from the concrete. The coating could not be separated from the concrete by the use of a sharp chisel at the interface of the concrete and coating.

What is claimed is:

1. A method of applying a filled thermosetting resin flooring material to an essentially horizontal substrate to produce a non-porous protective coating including the steps of:
   (a) compounding a mixture consisting essentially of a thermosetting resin with an aggregate, the mixture using a low level of 50 to 75% aggregate by weight;
   (b) the aggregate being a graded aggregate that will produce maximum packing and having a specific gravity of over 2.0;
   (c) the thermosetting resin being selected from the group consisting of epoxy, polyester, vinyl ester, urethane and furan having a room temperature cure and a viscosity less than 1500 cps;
   (d) spreading or troweling the mixture on the substrate producing a resin rich layer upon settling; and
   (e) broadcasting onto the resin rich layer an aggregate having a specific gravity of over 2.0, thereby producing a finished flooring material containing 76 to 82% aggregate by weight.

2. The method of claim 1 where the aggregate is silica sand, flint, aluminum oxide, or treated silicas.

* * * * *